(12) United States Patent
Lima (10) Patent No.: US 11,746,760 B2
(45) Date of Patent: Sep. 5, 2023

(54) ARTIFICIAL MUSCLE TENTACLES

(71) Applicant: Lintec of America, Inc., Richardson, TX (US)

(72) Inventor: Marcio Dias Lima, Richardson, TX (US)

(73) Assignee: LINTEC OF AMERICA, INC., Plano, TX (US)

(*) Notice: Subject to any disclaimer, the term of this patent is extended or adjusted under 35 U.S.C. 154(b) by 573 days.

(21) Appl. No.: 16/970,828

(22) PCT Filed: Feb. 22, 2019

(86) PCT No.: PCT/US2019/019176
§ 371 (c)(1),
(2) Date: Aug. 18, 2020

(87) PCT Pub. No.: WO2019/165226
PCT Pub. Date: Aug. 29, 2019

(65) Prior Publication Data
US 2020/0378369 A1     Dec. 3, 2020

Related U.S. Application Data

(60) Provisional application No. 62/634,124, filed on Feb. 22, 2018.

(51) Int. Cl.
*F03G 7/06*     (2006.01)
*G05B 19/402*     (2006.01)

(52) U.S. Cl.
CPC .............. *F03G 7/06* (2013.01); *G05B 19/402* (2013.01); *G05B 2219/39462* (2013.01)

(58) Field of Classification Search
CPC ................. F03G 7/06; G05B 19/402; G05B 2219/39462; G05B 11/00; G05B 15/00; G05B 19/00
See application file for complete search history.

(56) References Cited

U.S. PATENT DOCUMENTS

| 10,982,739 B2 | 4/2021 | Lima et al. |
| 2003/0205045 A1* | 11/2003 | Peles ............ F15B 7/006 60/473 |

(Continued)

FOREIGN PATENT DOCUMENTS

| JP | 2013-55877 | 3/2013 |
| JP | 2019-520522 | 7/2019 |

(Continued)

OTHER PUBLICATIONS

Decision to Grant a Patent in Japanese Patent Application No. 2020-543918 dated Jun. 7, 2021 and English language translation thereof.

(Continued)

*Primary Examiner* — Kidest Bahta
(74) *Attorney, Agent, or Firm* — Greenblum & Bernstein, P.L.C.

(57) ABSTRACT

An artificial muscle tentacle and method for manufacturing an artificial muscle tentacle, and a computer readable medium for controlling an artificial muscle tentacle are disclosed. The artificial muscle tentacle includes two spacers and a central core that connects the two spacers. The artificial muscle tentacle also includes at least two Z-Twist actuators and at least two S-Twist actuators. The Z-Twist actuators and the S-Twist actuators are disposed around the central core and in between the two spacers connecting the two spacers. The actuation of one or more of the Z-Twist actuators and the S-Twist actuators actuates the artificial muscle tentacle.

20 Claims, 11 Drawing Sheets

(56) References Cited

U.S. PATENT DOCUMENTS

| | | |
|---|---|---|
| 2010/0287928 A1 | 11/2010 | Chiel et al. |
| 2014/0250881 A1 | 9/2014 | Yamamoto et al. |
| 2015/0040753 A1 | 2/2015 | Bishop-Moser et al. |
| 2015/0152852 A1* | 6/2015 | Li .......................... D01H 1/10 60/527 |
| 2017/0314538 A1* | 11/2017 | Mazzeo .................. B25J 9/142 |
| 2018/0058480 A1* | 3/2018 | Asai ........................ B25J 9/142 |
| 2019/0154122 A1 | 5/2019 | Lima et al. |
| 2020/0040876 A1 | 2/2020 | Kwon et al. |

FOREIGN PATENT DOCUMENTS

| | | |
|---|---|---|
| KR | 2016-0117658 A | 10/2016 |
| WO | 2017/190054 A1 | 11/2017 |
| WO | 2019/084420 A1 | 5/2019 |
| WO | 2019/104164 A1 | 5/2019 |

OTHER PUBLICATIONS

International Search Report issued in corresponding International Application No. PCT/US2019/019176 dated Jun. 4, 2019 (3 pages).
Written Opinion issued in corresponding International Application No. PCT/US2019/019176 dated Jun. 4, 2019 (7 pages).

* cited by examiner

ARTIFICIAL MUSCLE TENTACLES

CROSS REFERENCE TO RELATED APPLICATIONS

This is a national stage application of International Patent Application No. PCT/US2019/019176, filed on Feb. 22, 2020, and claims priority to U.S. Provisional Patent Application No. 62/634,124 filed on Feb. 22, 2018. The contents of these applications are hereby incorporated by reference in their entirety.

The material of the following applications may be used in conjunction with embodiments disclosed herein: PCT/US2018/057736, filed on Oct. 26, 2018 entitled "CARBON NANOTUBE SHEET WRAPPING MUSCLES" and PCT/US2018/062242, filed on Nov. 21, 2018, entitled "EMBEDDED CONDUCTIVE WIRES IN POLYMER ARTIFICIAL MUSCLE ACTUATING DEVICES." The contents of these applications are hereby incorporated by reference in their entirety.

BACKGROUND

Artificial muscle devices based on twisted polymeric and carbon nanotube (CNT) fibers and yarns have a wide range of applications. Artificial muscle devices comprising twisted and/or coiled polymers have the advantages of lower manufacturing cost, higher production volume, lower operation noise, and simpler design over conventional motors.

SUMMARY

In one aspect, one or more embodiments of the invention relate to an artificial muscle tentacle that includes two spacers and a central core that connects the two spacers at the center of the two spacers. The artificial muscle tentacle includes at least two Z-Twist actuators and at least two S-Twist actuators. The Z-Twist actuators and the S-Twist actuators are disposed around the central core and in between the two spacers connecting the two spacers. The actuation of one or more of the Z-Twist actuators and S-Twist actuators actuates the artificial muscle tentacle.

In another aspect, one or more embodiments of the invention relate to a method for manufacturing an artificial muscle tentacle that includes disposing a central core in between two spacers, and disposing two S-Twist actuators and two Z-Twist actuators around in between the spacers around the central core. The two spacers are connected via the central core, the two Z-Twist actuators and the two S-Twist actuators.

In another aspect, one or more embodiments of the invention relate to a computer readable medium for controlling an artificial muscle tentacle. The computer readable medium includes instructions to control a processor to instigate actuation of a first actuator among at least two Z-Twist and at least two S-Twist actuators in an artificial muscle tentacle and instigate actuation of a second actuator among the at least two Z-Twist and at least two S-Twist actuators. The actuation of the first and second actuators actuates the artificial muscle tentacle.

Other aspects and advantages of one or more embodiments disclosed herein will be apparent from the following description and the appended claims.

DETAILED DESCRIPTION

In the following detailed description of embodiments of the disclosure, numerous specific details are set forth in order to provide a more thorough understanding of the invention. However, it will be apparent to one of ordinary skill in the art that the disclosure may be practiced without these specific details. In other instances, well-known features have not been described in detail to avoid unnecessarily complicating the description.

In general, embodiments of the invention relate to an artificial muscle tentacle and a method of making an artificial muscle tentacle. More specifically, embodiments disclosed herein are directed to an artificial muscle tentacle that includes at least two Z-Twist actuators and two S-Twist actuators. The disclosed artificial muscle tentacle can rotate, bend, contract, and extend upon actuation of the Z-Twist and the S-Twist actuators.

The actuators in accordance with one or more embodiments herein are thermal actuators. Thermal actuators are made of twisted/coiled polymers and actuate by applying heat to the polymers. The heated polymers expand and create torsional/tensional actuations. In an aspect of one or more embodiments, the actuators actuate via resistive heating. For example, a conductive material such as a metallic wire or CNT sheets/wires may be wrapped around the polymers of the actuators, and an electric current passing through the conductive material will heat and expand the polymers.

However, embodiments of the invention are not limited to only thermal actuators, and other types of actuators may be used based on a specific design and function of the invention. For example, other types of actuators that may be used are hydraulic and pneumatic actuators. In hydraulic and pneumatic actuators, the pressure inside the hollow actuator tube is used to control the actuation. Chemical based actuators may also be used. For example, a chemical catalyst may be incorporated into the hollow actuator tube to instigate a chemical reaction that changes the pressure inside the hollow actuator tube, causing the desired actuation.

Figure 1:
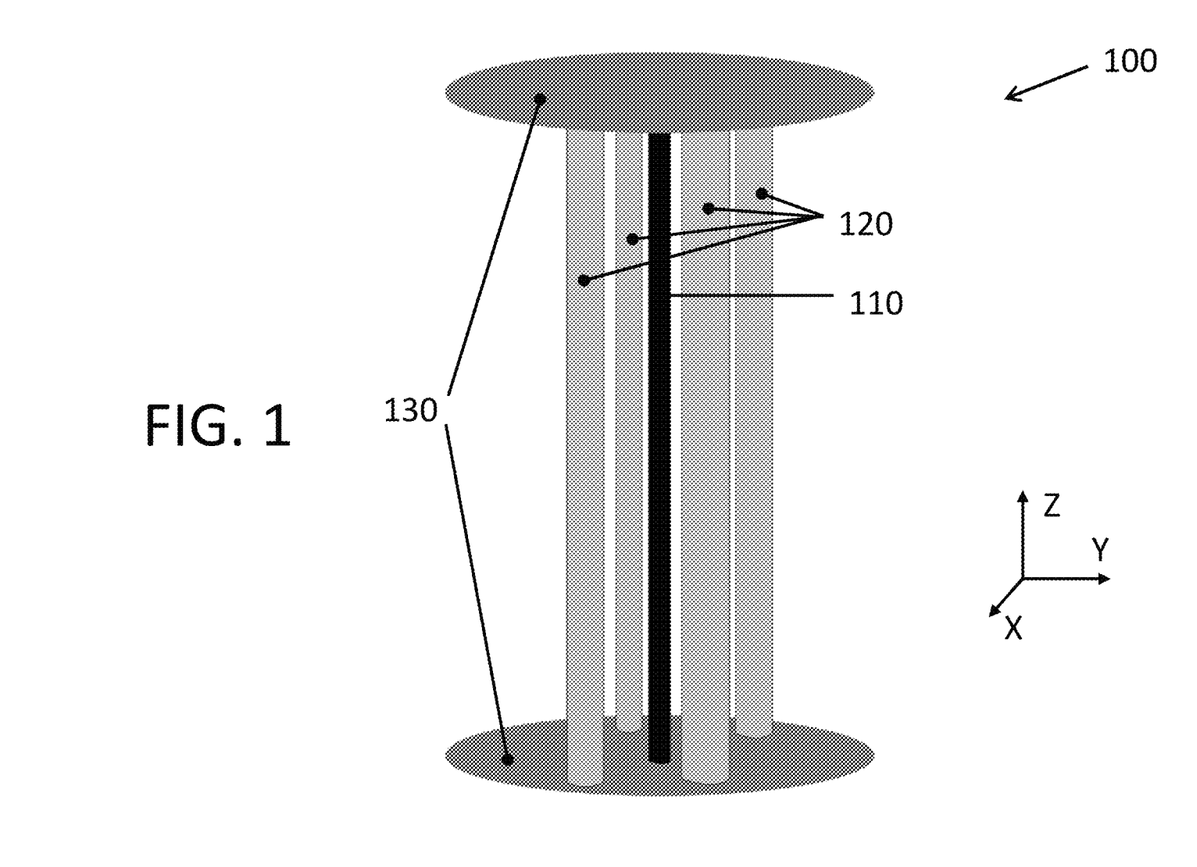
FIG. 1 shows a diagram of an artificial muscle tentacle in accordance with one or more embodiments of the invention.

FIG. 1 shows an artificial muscle tentacle (100) that includes a central core (110), four actuators (120) (including two Z-Twist actuators and two S-Twist actuators) and two spacers (130). The central core (110) lends mechanical strength and rigidity to the artificial muscle tentacle (100), allowing the tentacle to reliably bear a load. The central core (110) further separates the spacers (130) and the actuators (120). The spacers (130) form the frame of the artificial muscle tentacle (100) and keep the actuators (120) apart.

In one aspect of one or more embodiments, the central core (110) may be extensible, allowing the movement of the artificial muscle tentacle (100). Soft silicone fibers are particularly useful materials to be used as the central core (110), but other elastic materials such as coiled fibers and springs may be used. In some embodiments, springs may help the actuation by assisting the actuators (120) in returning to their normal length when cooling.

In one aspect of one or more embodiments, the central core (110) may be inextensible and include one or more joints. Such an embodiment allows for movement of the artificial muscle tentacle (100) without extendibility. For example, an inextensible central core (110) may be a chain.

In one or more embodiments, after actuation, to cool the actuators (120) and return them to their initial forms more quickly, cooling fans and/or liquids may be used to controllably cool the actuators (120). For example, membranes may be disposed around the actuators (120) and allow a coolant fluid to pass around the actuators (120) and extract their heat.

Figure 2A:
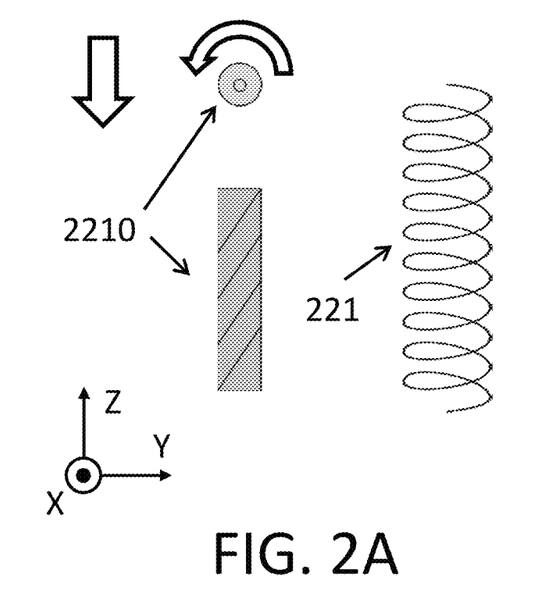
FIGS. 2A-2B are schematics describing actuation in accordance with one or more embodiments of the invention.
Figure 2B:
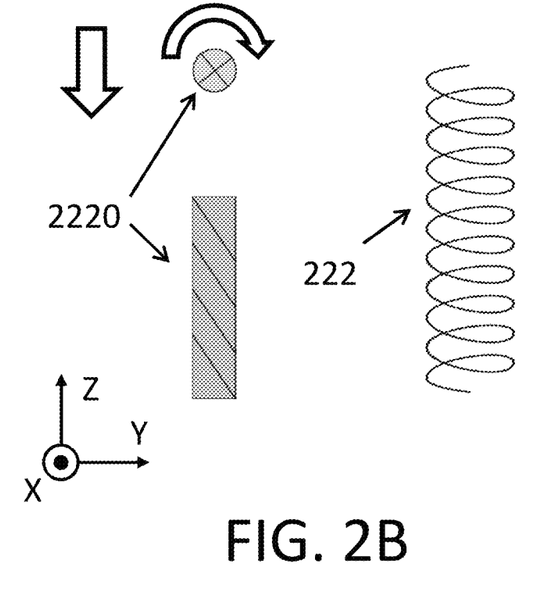

In one or more embodiments, the actuators are made of twisted polymeric fibers (hereinafter referred to as "twisted fiber") that are coiled. FIGS. 2A-2B show top-views (on the top of the figures) and side-views (on the bottom of the figures) of two oppositely twisted fibers (2210, 2220). The twisted fiber that is twisted counter clockwise is a Z-Twist fiber (2210) and the twisted fiber that is twisted clockwise is an S-Twist fiber (2220) (in a view along the top-down arrows in FIGS. 2A-2B). The Z-Twist and S-Twist fibers (2210, 2220) are coiled to create the Z-Twist and S-Twist actuators (221, 222). The direction of the torsional actuation of the Z-Twist and S-Twist actuators (221, 222) is the same as the twisting directions of the Z-Twist and S-Twist fibers (2210, 2220), respectively. Accordingly, actuations of the Z-Twist and S-Twist actuators (221, 222) correspond to right-handedness and left-handedness directions in accordance with FIGS. 2A and 2B, respectively.

In one or more embodiments, the Z-Twist and S-Twist actuators (221, 222) may be homochiral muscles, meaning that the direction of the twist of the twisted fibers (2210, 2220) in the actuators (221, 222) is the same as the coiling direction of the actuators (221, 222). For example, the Z-Twist and S-Twist actuators (221, 222) shown in FIGS. 2A-2B are homochiral muscles. Homochiral muscles attempt to actuate rotationally when heated. However, if the rotational movement is precluded, homochiral muscles will contract linearly (i.e., along the length of the homochiral muscles that is along the "Z" axis in FIGS. 2A-2B). The Z-Twist and S-Twist actuators may also be heterochiral muscles, meaning that the direction of the twist in the twisted fibers (2210, 2220) is opposite to the coiling direction of the twisted fibers (2210, 2220). Heterochiral muscles also attempt to actuate rotationally when heated, but if the rotational movement is precluded, then heterochiral muscles will extend linearly.

Figure 3:
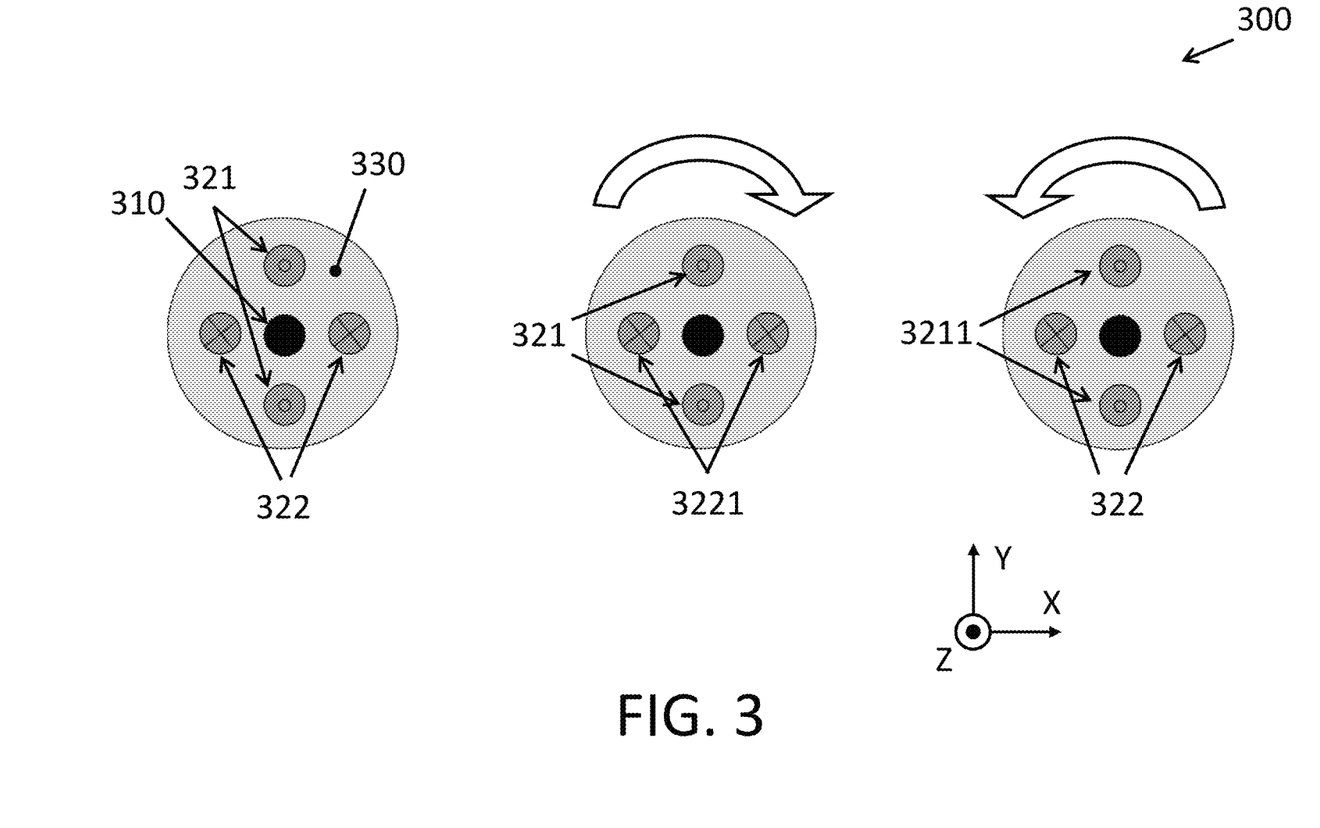
FIG. 3 shows a schematic of an artificial muscle tentacle in accordance with one or more embodiments of the invention.

In an aspect of one or more embodiments, upon selective actuation of the Z-Twist and the S-Twist actuators, the artificial muscle tentacle may rotate, bend, contract, or extend. For example, FIG. 3 illustrates a cross-sectional view of an artificial muscle tentacle (300) along the "Z" axis. In the configuration shown in the left subset of FIG. 3, the Z-twist actuators (321) and the S-Twist actuators (322) are disposed around the central core (310) alternatively in between two spacers (330) such that an adjacent actuator of a Z-twist actuator (321) is an S-Twist actuator (322) and vice versa.

By selectively actuating the Z-twist and S-Twist actuators (321, 322), the artificial muscle tentacle (300) can move in a desired direction. For example, as shown in the middle subset of FIG. 3, by actuating the S-Twist actuators (322) simultaneously while the Z-Twist actuators (321) are idle (i.e., not actuated), the actuated S-Twist actuators (3221) apply a torque clockwise and the Z-Twist actuators (321) remain neutral. Therefore, the artificial muscle tentacle (300) rotates clockwise. In contrast, as shown in the right subset of FIG. 3, by actuating only Z-Twist actuators (321) simultaneously while the S-Twist actuators (322) are idle, the actuated Z-Twist actuators (3211) apply a torque counter clockwise and the S-Twist actuators (322) remain neutral. Therefore, the artificial muscle tentacle (300) rotates counter clockwise.

Figure 4:
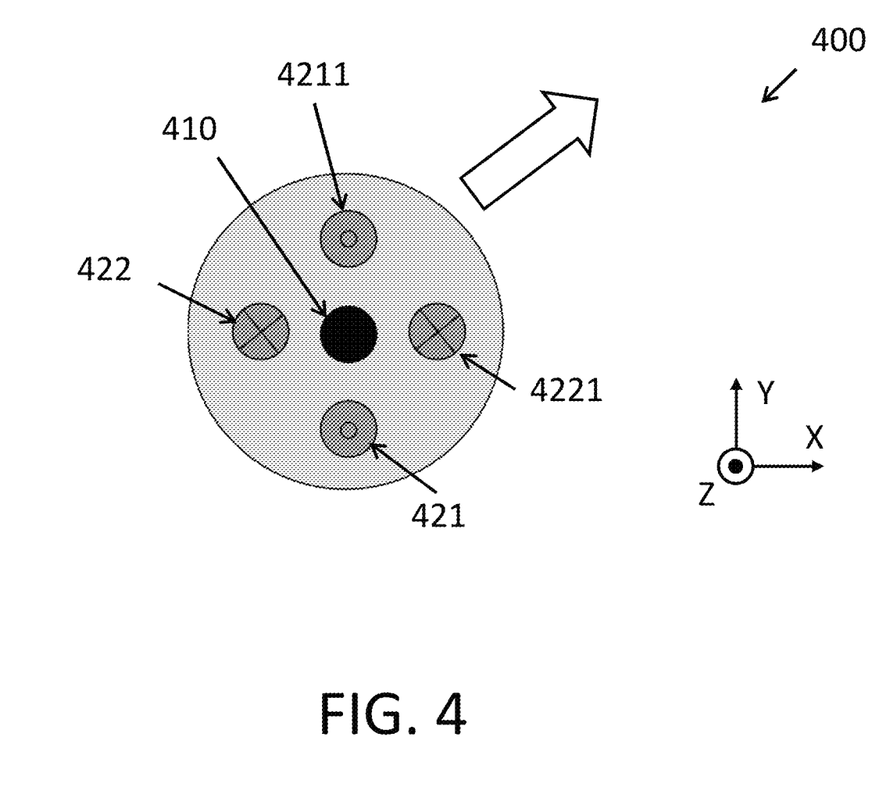
FIG. 4 shows a schematic of an artificial muscle tentacle in accordance with one or more embodiments of the invention.

In an aspect of one or more embodiments, the artificial muscle tentacle can bend in a direction that depends on the actuation of the Z-Twist and S-Twist actuators. FIG. 4 shows an example of an artificial muscle tentacle (400) in which the Z-Twist and S-Twist actuators (421, 422) are homochiral muscles. Upon actuation of a Z-Twist actuator (421) and an adjacent S-Twist actuator (422), the actuated Z-Twist actuator (4211) and the actuated S-Twist actuator (4221) apply torques in opposite directions (counter clockwise and clockwise, respectively) that prevent the artificial muscle tentacle (400) from rotating. Prevented from rotation, the actuated Z-Twist and the actuated S-Twist actuators (4211, 4221) (which are homochiral muscles) contract in accordance with embodiments disclosed herein. Thus, the artificial muscle tentacle (400) bends in a direction that is from the central core (410) toward a middle of an imaginary line that connects the actuated Z-Twist and S-Twist actuators (4211, 4221). The bending direction is illustrated by the empty arrow in FIG. 4.

Figure 5:
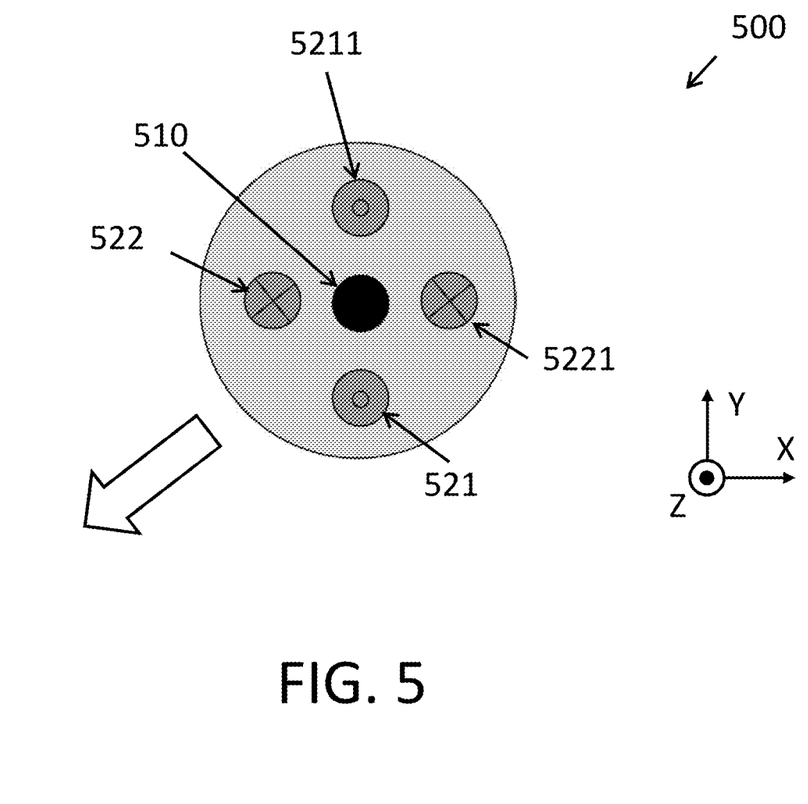
FIG. 5 shows a schematic of an artificial muscle tentacle in accordance with one or more embodiments of the invention.

FIG. 5 illustrates another example for bending an artificial muscle tentacle (500) in which the Z-Twist and S-Twist actuators (521, 522) are heterochiral muscles. Upon actuation of a Z-Twist actuator (521) and an adjacent S-Twist actuator (522), the actuated Z-Twist actuator (5211) and the actuated S-Twist actuator (5221) apply torques in opposite directions that prevent the artificial muscle tentacle (500) from rotating. Preventing the rotation, the actuated Z-Twist and the actuated S-Twist actuators (5211, 5221) (which are heterochiral muscles) extend in accordance with embodiments disclosed herein. Thus, the artificial muscle tentacle (500) bends in a direction that is from the middle of an imaginary line that connects the actuated Z-Twist and S-Twist actuators (5211, 5221) toward the central core (510). The bending direction is illustrated by the empty arrow in FIG. 5.

In one or more embodiments, when the all four homochiral Z-Twist and S-Twist actuators (4211, 4221) actuate simultaneously, the artificial muscle tentacle (400) cannot rotate or bend because the all four actuators create opposite forces that cancel each other. Therefore, in this case, the artificial muscle tentacle (400) will contract. Similarly, if the all four actuators are heterochiral muscles (similar to the actuators in FIG. 5) and actuate, the artificial muscle tentacle (500) will extend.

Figure 6A:
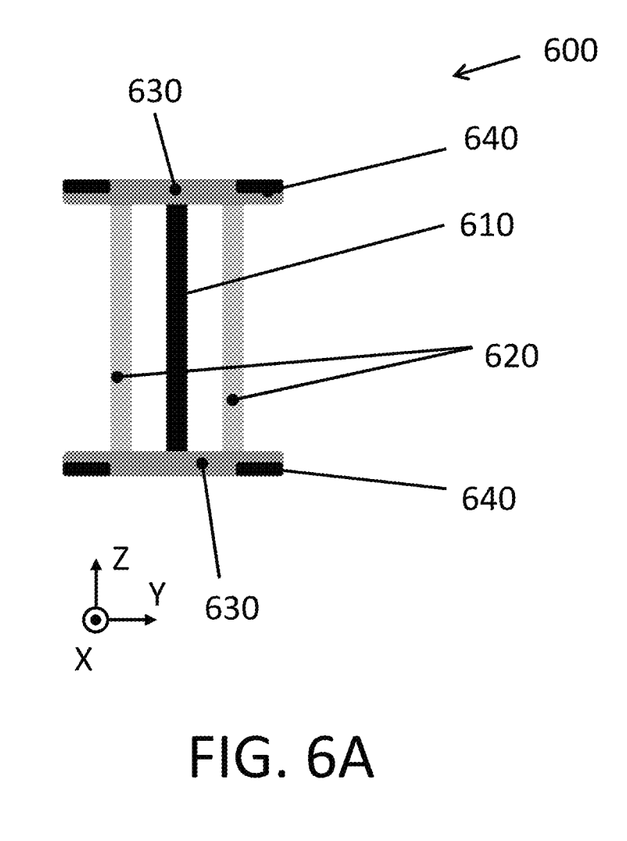
FIGS. 6A-6B show schematics of an modular artificial muscle tentacles in accordance with one or more embodiments of the invention.
Figure 6B:
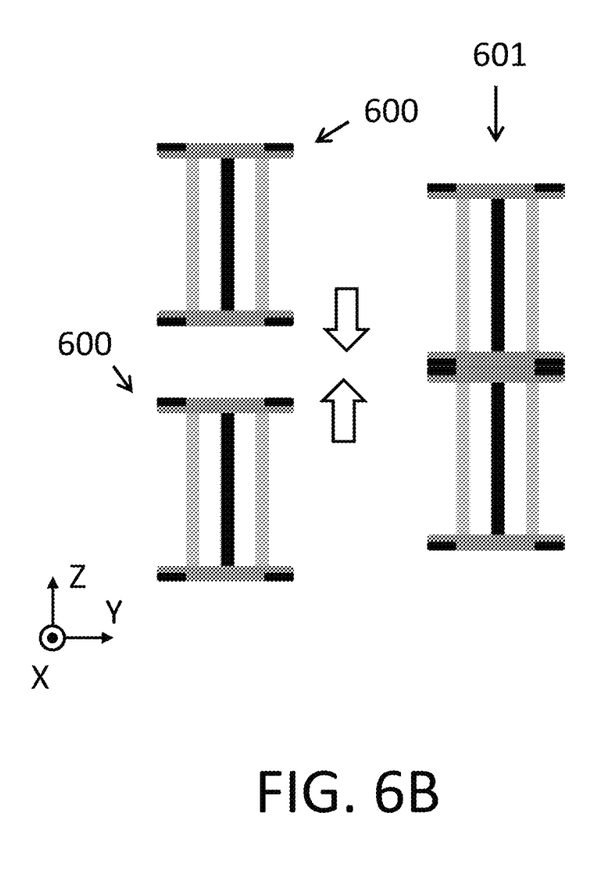

Embodiments of the invention include assembling one or more of the artificial muscle tentacles to create a modular muscle tentacle. FIG. 6A shows a side-view of an artificial muscle tentacle (600) that includes actuators (620) (such as the Z-Twist and S-Twist actuators described above), a central core (610), and magnets (640) disposed on the spacers (630). FIG. 6B shows a modular muscle tentacle (601) made of two artificial muscle tentacles (600) snapped to each other via the magnets (640). The magnets (640) may conduct electrical current from one artificial muscle tentacle (600) to the next snapped artificial muscle tentacle (600). The number of artificial muscle tentacles (600) snapped to each other is not limited to two and may be more.

According to one or more embodiments, in the modular muscle tentacle (601), the actuators (620) of each of the artificial muscle tentacles (600) can be actuated independently by a microcontroller. Therefore, each of the artificial muscle tentacles (600) can rotate, bend, contract, or extend independently from the other artificial muscle tentacles (600) in the modular muscle tentacle (601). For example, each of the artificial muscle tentacles (600) may be actuated similar to the artificial muscle tentacles describe above with reference to FIGS. 3-5 to realize various actuations and shapes for the modular muscle tentacle (601).

FIGS. 7-11 show implementation examples for the artificial muscle tentacles and the modular muscle tentacles in accordance with one or more embodiments. FIGS. 7-11 show idle (i.e., non-actuated) modular muscle tentacles (701, 801, 901, 101, 111) on the left side of the figures and actuated modular muscle tentacles (7011, 8011, 9011, 1011, 1111) on the right side of the figures.

In FIGS. 7-11, the artificial muscle tentacles (700, 800, 900, 1000, 1100) may be actuated to move the actuated modular muscle tentacles (7011, 8011, 9011, 1011, 1111) in any desired directions.

Figure 7:
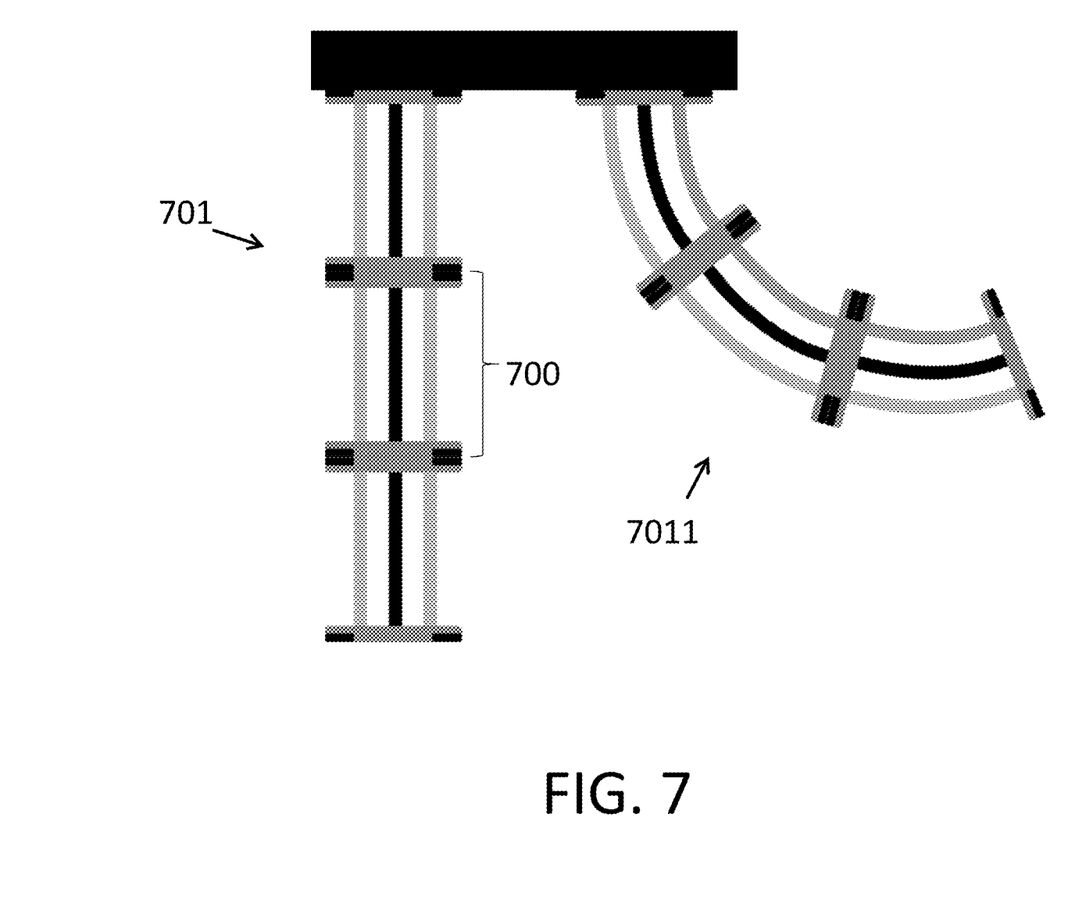
FIG. 7 shows a schematic describing actuation in accordance with one or more embodiments of the invention.
Figure 8:
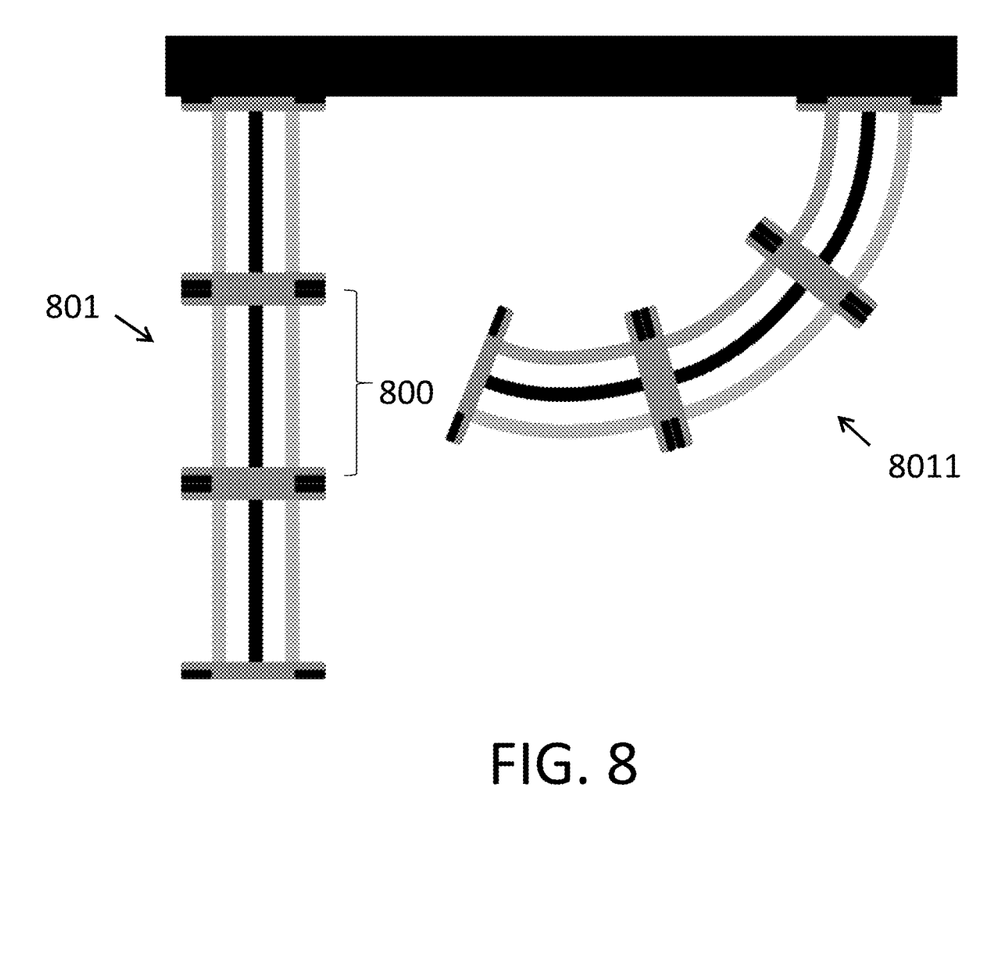
FIG. 8 shows a schematic describing actuation in accordance with one or more embodiments of the invention.

In the example shown by FIGS. 7-8, all of the artificial muscle tentacles (700, 800) may bend in the same direction such that the entirety of the actuated modular muscle tentacles (7011, 8011) bends in the same direction. On the other hand, in the example shown in FIG. 9, two of the artificial muscle tentacles (900) bend toward the right-side of the figure, while the other two artificial muscle tentacles (900) bend toward the opposite side such that the actuated modular muscle tentacle (9011) forms an "S" shape. The artificial muscle tentacles (700, 800, 900) may bend with the similar mechanisms described above with reference to FIGS. 4-5.

Figure 10:
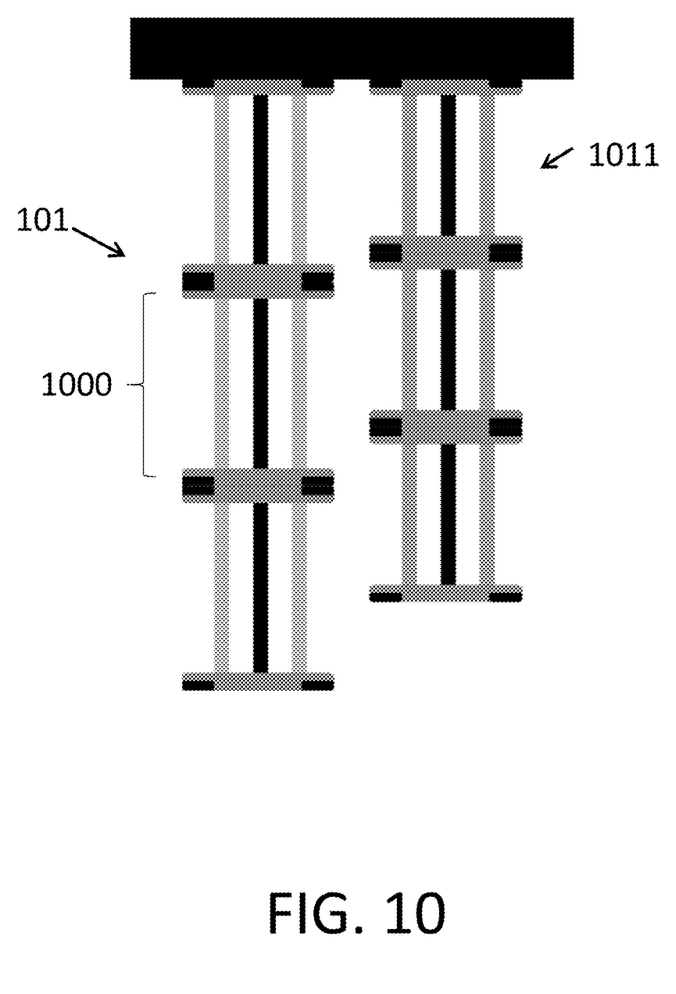
FIG. 10 shows a schematic describing actuation in accordance with one or more embodiments of the invention.
Figure 11:
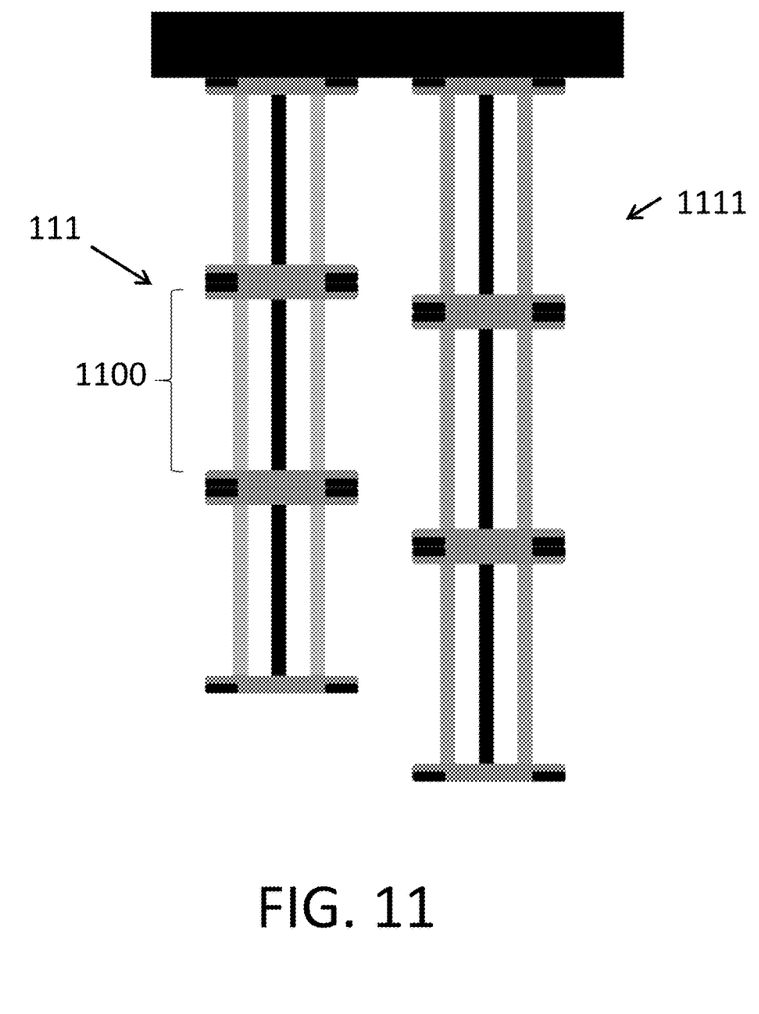
FIG. 11 shows a schematic describing actuation in accordance with one or more embodiments of the invention.

In another example with reference to FIGS. 10-11, the artificial muscle tentacles (1000, 1100) may contract or extend with the mechanisms described above (i.e., all the actuator in the tentacles actuate simultaneously). The actuators of the artificial muscle tentacles (1000) of the modular muscle tentacle (101) in FIG. 10 are homochiral muscles. Thus, upon actuation, the actuated modular muscle tentacle (1011) contracts. On the other hand, the actuators of artificial muscle tentacles (1100) of the modular muscle tentacle (101) in FIG. 11 are heterochiral muscles. Thus, upon actuation, the actuated modular muscle tentacle (1111) extends.

All of the figures in this application are examples and provided for the purpose of illustration, and one or more embodiments of the invention can vary from the figures. For example, the modular muscle tentacles described above can include any desired number of actuators to achieve a specific function.

One or more embodiments relate to a preparation method of an artificial muscle tentacle. To create the artificial muscle tentacle disclosed herein, at least two Z-Twist actuators and at least two S-Twist actuators are disposed around a central core in between two spacers. The Z-Twist and S-Twist actuators may be disposed around the central core alternatively. The Z-Twist and S-Twist actuators may also be homochiral and contract, or they may be heterochiral and extend upon actuation. The actuators, central core, and spacers may be similar to those described in the above embodiments.

In one or more embodiments disclosed herein, the core may be attached to spacers using a set screw or adhesive. For example, the core may be inserted through a hole in the spacer and secured with a set screw. The core should fit snugly into the hole. The artificial muscles may be attached to the spacers via a tether point that includes electrical contacts to supply a current for actuation. Similar to the core, the muscles may be run through a tightly fit hole and secured to the spacers using set screws. One of ordinary skill in the art will appreciate that there exists different methods for securing the core and muscles, for example, adhesives or the spacer could constructed in parts to clamp around the core and artificial muscles.

One or more embodiments relate to a non-transitory computer readable medium for controlling the artificial muscle tentacle. For example, programs for controlling an artificial muscle tentacle, or a plurality of connected artificial muscle tentacles, may be developed to achieve the desired movement of the tentacle. For example, the computer readable medium may instruct a processor to instigate the actuation of one or more of a first actuator among two Z-Twist and two S-Twist actuators in an artificial muscle tentacle. This instigation may be an instruction that leads to an applied voltage or an applied pressure to actuate the first actuator. The computer readable medium may also instigate actuation of a second actuator among the two Z-Twist and two S-Twist actuators.

In one or more embodiments, the computer readable medium may control a microcontroller that applies one or more specific voltages to one or more specific modular sections of an artificial muscle tentacle in order to instigate the desired actuation or task of the artificial muscle tentacle. Embodiments disclosed herein may also include a position sensor that determines the position of the artificial muscle tentacle. The position sensor may monitor the position of the artificial muscle tentacle as well as supply feedback to the system to verify the position or facilitate the actuation of the artificial muscle tentacle.

Figure 9:
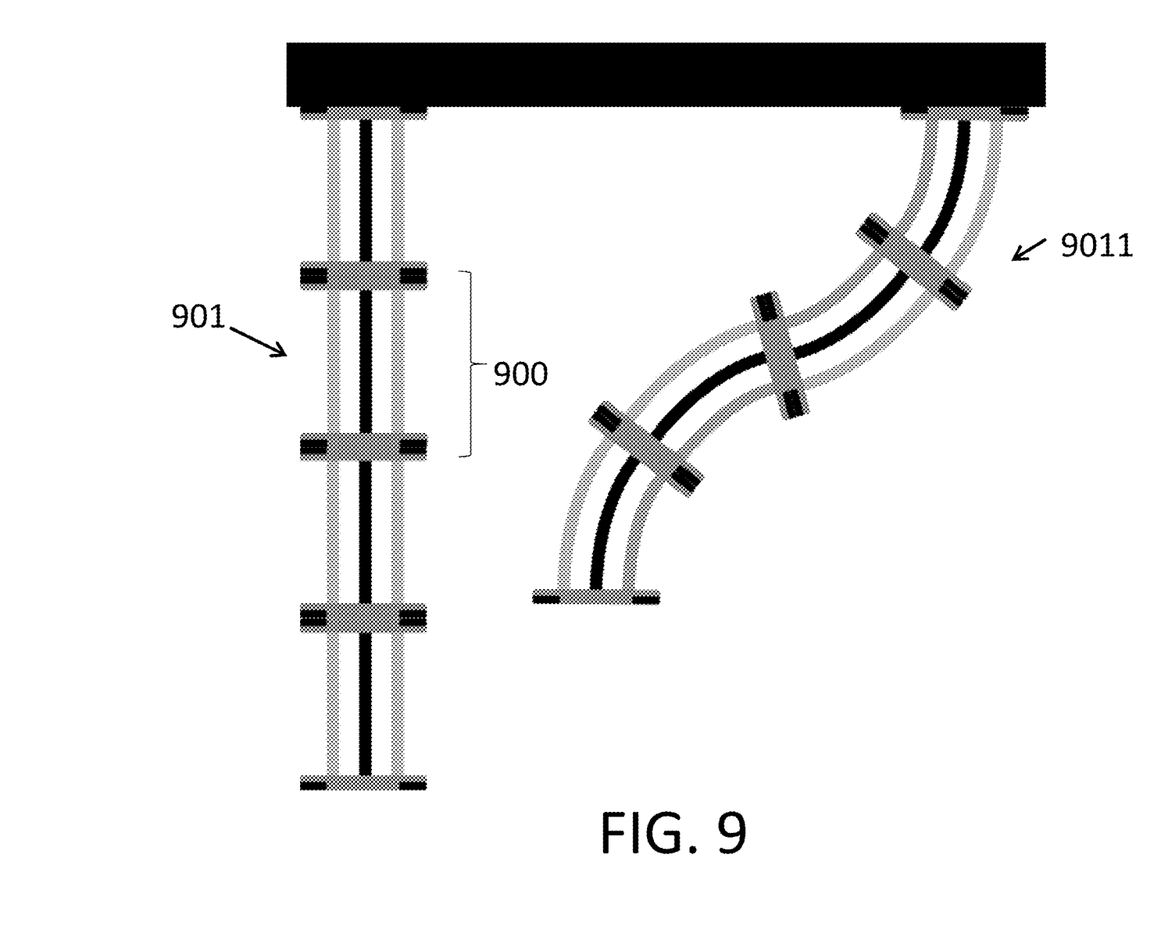
FIG. 9 shows a schematic describing actuation in accordance with one or more embodiments of the invention.

In accordance with embodiments disclosed herein, as described in FIGS. 7-9, if the first and second actuators are Z-twist actuators, the actuation of the first and second actuators rotates the artificial muscle tentacle. Similarly, if the first actuator is a Z-Twist actuator and the second actuator is an S-Twist actuator, the actuation of the first and second actuators bends the artificial muscle tentacle.

In accordance with embodiments disclosed herein, the computer readable medium may instruct a processor to control all the actuators in the artificial muscle tentacle. As described in FIGS. 10-11, if the actuators are homochiral, the artificial muscle tentacle contracts linearly. Similarly, if the actuators are heterochiral, the artificial muscle tentacle extends linearly.

According to one or more embodiments, the artificial muscle tentacle may be used as a mechanical arm to pass power and move a device that is installed on its movable end. Examples of such a device include, but are not limited to, a camera, a detector, a claw, a tool, etc.

Although the disclosure has been described with respect to only a limited number of embodiments, those skilled in the art, having benefit of this disclosure will appreciate that various other embodiments may be devised without departing from the scope of the present invention. Accordingly, the scope of the invention should be limited only by the attached claims.

What is claimed is:

1. An artificial muscle tentacle, comprising:
   two spacers;
   a central core that connects the two spacers, wherein the two spacers are provided at opposing ends of the central core;
   two Z-Twist actuators; and
   two S-Twist actuators,
   wherein the two Z-Twist actuators and the two S-Twist actuators, comprising twisted and/or coiled fiber, are disposed, apart from each other, around the central core and extend longitudinally in between the two spacers so as to connect the two spacers, and
   wherein actuation of one or more of the two Z-Twist actuators and the two S-Twist actuators actuates the artificial muscle tentacle.

2. The artificial muscle tentacle of claim 1, wherein the central core is a bar.

3. The artificial muscle tentacle of claim 1, wherein the central core is any of soft silicone fibers, coiled fibers, or springs.

4. The artificial muscle tentacle of claim 1, wherein the central core is inextensible, allowing the movement of the artificial muscle device.

5. The artificial muscle tentacle of claim 1, wherein the central core is a chain.

6. The artificial muscle tentacle of claim 1, further comprising: a cooling fan that cools the artificial muscle tentacle.

7. The artificial muscle tentacle of claim 1, further comprising:
   one or more membranes disposed around the two Z-Twist actuators and the two S-Twist actuators,
   wherein the one or more membranes contain a cooling fluid that removes heat from the two Z-Twist actuators and the two S-Twist actuators.

8. A modular muscle tentacle, comprising:
   a plurality of the artificial muscle tentacles of claim 1 latched together by linearly snapping one end of each of the artificial muscle tentacles to one end of another artificial muscle tentacle;
   one or more microcontrollers to control each of the artificial muscle tentacles independently;
   wherein each spacer of the plurality of artificial muscle tentacles comprises a magnet that linearly snaps the plurality of artificial muscle tentacles together, and
   wherein the magnets conduct electrical current from one artificial muscle tentacle to a next artificial muscle tentacle.

9. The artificial muscle tentacle of claim 1, wherein the two Z-Twist actuators and the two S-Twist actuators are homochiral muscles.

10. The artificial muscle tentacle of claim 1, wherein the two Z-Twist actuators and the two S-Twist actuators are heterochiral muscles.

11. A method for manufacturing an artificial muscle tentacle, the method comprising:
   disposing a central core in between two spacers provided at opposing ends of the central core;
   disposing, apart from each other, two S-Twist actuators and two Z-Twist actuators, comprising twisted and/or coiled fiber, around the central core and extending longitudinally in between the two spacers,
   wherein the two spacers are connected via the central core, the two S-Twist actuators, and the two Z-Twist actuators; and
   the artificial muscle tentacle is configured such that actuation of one or more of the two Z-Twist actuators and the two S-Twist actuators actuates the artificial muscle tentacle.

12. The method of claim 11, wherein the central core is extensible.

13. The method of claim 12, wherein the central core is a bar.

14. The method of claim 12, wherein the central core is any of soft silicone fibers, coiled fibers, or springs.

15. The method of claim 11, wherein the central core is inextensible, allowing the movement of the artificial muscle device.

16. The method of claim 11, wherein the S-Twist actuators and the Z-Twist actuators are homochiral muscles.

17. A non-transitory computer readable medium for controlling an artificial muscle tentacle, comprising instructions to instruct a microcontroller to:
   instigate actuation of a first actuator among at least two Z-Twist and at least two S-Twist actuators in an artificial muscle tentacle, the at least two Z-Twist and at least two S-Twist actuators comprising twisted and/or coiled fiber; and
   instigate actuation of a second actuator among the at least two Z-Twist and at least two S-Twist actuators,
   wherein the actuation of the first and second actuators actuates the artificial muscle tentacle, wherein
   the first and second actuators are disposed apart from each other and extend longitudinally in between two spacers provided at opposing ends of the artificial muscle tentacle so as to connect the two spacers.

18. The non-transitory computer readable medium of claim 17, wherein:
   the first and second actuators are Z-twist actuators, and
   the actuation of the first and second actuators rotates the artificial muscle tentacle.

19. The non-transitory computer readable medium of claim 17, wherein:
   the first actuator is a Z-Twist actuator and the second actuator is an S-Twist actuator, and
   the actuation of the first and second actuators bends the artificial muscle tentacle.

20. The non-transitory computer readable medium of claim 17, further comprising instructions to instruct the microcontroller to:
   instigate actuation of a third actuator among the at least two Z-Twist and at least two S-Twist actuators in an artificial muscle tentacle;
   instigate actuation of a fourth actuator among the at least two Z-Twist and at least two S-Twist actuators,
   wherein the actuation of the first to fourth actuators actuates the artificial muscle tentacle linearly.

* * * * *